(12) United States Patent
Penisch (10) Patent No.: US 8,919,271 B2
(45) Date of Patent: Dec. 30, 2014

(54) GUIDE MEANS HAVING TOLERANCE COMPENSATION FOR SEWING DECORATIVE ELEMENTS

(75) Inventor: Thomas Penisch, Karlsruhe (DE)

(73) Assignee: Faurecia Innenraum Systeme GmbH, Hagenbach (DE)

( * ) Notice: Subject to any disclaimer, the term of this patent is extended or adjusted under 35 U.S.C. 154(b) by 252 days.

(21) Appl. No.: 13/521,693

(22) PCT Filed: Jan. 11, 2011

(86) PCT No.: PCT/EP2011/000085
§ 371 (c)(1),
(2), (4) Date: Jul. 11, 2012

(87) PCT Pub. No.: WO2011/083098
PCT Pub. Date: Jul. 14, 2011

(65) Prior Publication Data
US 2012/0279431 A1 Nov. 8, 2012

(30) Foreign Application Priority Data
Jan. 11, 2010 (DE) .......................... 10 2010 004 288

(51) Int. Cl.
*D05B 15/06* (2006.01)
*B68G 7/10* (2006.01)
*B60N 2/58* (2006.01)
*B60R 13/02* (2006.01)
*D05B 15/00* (2006.01)
*D05B 35/02* (2006.01)
*D05B 35/00* (2006.01)

(52) U.S. Cl.
CPC .............. *B68G 7/105* (2013.01); *B60N 2/5891* (2013.01); *B60R 13/02* (2013.01); *D05B 15/00* (2013.01); *D05B 35/02* (2013.01); *B60R 2013/0293* (2013.01)
USPC .......................... 112/475.06; 112/52; 112/139

(58) Field of Classification Search
USPC .................. 112/39, 46, 52, 138, 139, 470.27, 112/475.06, 475.08, 147, 150, 152; 29/91.1, 91.6
See application file for complete search history.

(56) References Cited

U.S. PATENT DOCUMENTS

| | | | | |
|---|---|---|---|---|
| 273,915 A * | 3/1883 | Turner | ........................ | 112/152 |
| 378,823 A * | 2/1888 | Arnold | ........................ | 112/150 |
| 1,562,930 A * | 11/1925 | Turner | ........................ | 112/139 |
| 2,682,844 A | 7/1954 | MacPherson | | |
| 2,878,762 A * | 3/1959 | Rubico | ........................ | 112/52 |
| 3,867,890 A * | 2/1975 | Hamilton et al. | ............. | 112/139 |

OTHER PUBLICATIONS

International Search Report for PCT/EP2011/000085, Apr. 18, 2011, 2 pages (translated).

* cited by examiner

*Primary Examiner* — Ismael Izaguirre
(74) *Attorney, Agent, or Firm* — Reising Ethington P.C.

(57) ABSTRACT

The invention relates to a guiding device for guiding an oblong intermediate element while joining at least two decorative elements by means of this intermediate element.

20 Claims, 7 Drawing Sheets

GUIDE MEANS HAVING TOLERANCE COMPENSATION FOR SEWING DECORATIVE ELEMENTS

TECHNICAL FIELD

The invention relates to a guiding device for guiding an oblong intermediate element while joining at least two decorative elements by means of this intermediate element.

BACKGROUND

Guiding device for joining at least two decorative elements by means of an intermediate element are basically known, and are used, for example, to sew up intermediate elements in the form of braids or welts between two decorative elements, e.g., leather layers. After the sewing process, the braid or welt is usually located on the visible face of a decorative part comprised of the two decorative elements and the intermediate element. The disadvantage to the known guiding device involves having to accept in part large tolerances, in particular tolerance additions. Tolerances of up ±1 mm or more are commonly encountered when manufacturing known intermediate elements, in particular braids or welts.

The hollow tubes or hollow profiles furnished for use as guides for the intermediate elements, such as braids or welts, must provide the intermediate element with some play in this hollow profile, since a jamming would otherwise prevent the intermediate element from moving in the guide rail. The play inside the guiding profile can here also measure up to 1 mm with respect to the maximum dimensions of the braid or welt.

As a consequence, the play inside the guide rail is added to the necessarily existing manufacturing tolerance range of ±1 mm. The disadvantage to a decorative part fabricated in this way is that the visible end of the welt, braid or piping protrudes irregularly on the visible face of the decorative part. This produces a restless and irregular appearance, which is perceived among other things as a quality defect. In the finished decorative part, this is disadvantageous in particular when the goal is to have as uniform a transition as possible between the two decorative elements, for example, leather layers. In such a case, it is undesirable for the braids or welts to protrude over the two decorative layers on their visible face. In particular, protruding braids or welts can cause an undesirably high level of wear to prevail on the braids or welts. In addition to a visual detraction, this hence also gives rise to a loss in quality from a haptic standpoint. When using such decorative parts in vehicle construction, in particular for interior trim, the protruding braids or single welt are especially susceptible to wear.

SUMMARY

An object of the present invention is to resolve the above disadvantages. This object is achieved by a guiding device for guiding an oblong intermediate element when joining at least two decorative elements or blanks of decorative material by means of this intermediate element. The guiding device includes the following features:

A first stop for a first decorative element,
A second stop for a second decorative element,
A guide rail, whose inner progression corresponds at least partially to the outer contour of the intermediate element, wherein the guide rail exhibits an inlet opening and an outlet opening for the intermediate element,
A compensation device (50) for offsetting dimensional tolerances of the intermediate element (20).

The compensation device can here exert a force on the intermediate element, so that this intermediate element is pressed at least against a region of the guide rail, in this way defining the intermediate element in terms of its relative positions to the first and second stop.

An advantage of this guiding device is that it provides a compensation device able to offset the manufacturing tolerances of the intermediate element with respect to the relative position of the intermediate element to the two decorative elements. This compensation here takes place exclusively by positioning the intermediate element, thus eliminating the need for additional production steps, for example tailoring the intermediate element. Another advantage of this guiding device has to do with the fact that the precise alignment, and hence the reduced tolerances, can be realized in a single step when joining the decorative elements by way of the intermediate element in terms of the position of the intermediate element. As a consequence, the guiding device makes it possible to avoid not just the added design outlay involved in a second step, but also the added time outlay required by such an additional step.

Let it further be noted that the terms "first stop" and "second stop" may also be implemented as a joint stop, which assumes the function of a first and second stop for the two decorative elements. For example, a joint stop can be formed by a stop plate, which can further also accommodate the guide rail. As a consequence, the high functionality of a guiding device according to the invention can be imparted to a compact system. Of course, the present invention is not limited to two decorative elements, but can rather also be used for a plurality of decorative elements.

In a first step, it here makes no difference whether the compensation device offsets manufacturing tolerances of the intermediate element in just one or several dimensions. However, it may be advantageous in particular for the dimensional tolerances in manufacturing the intermediate element to be offset in the direction of the visible face of the decorative part to be fabricated. In addition, how the force is exerted on the intermediate element is basically irrelevant. A wide variety of options are conceivable for applying force with the compensation device. The direction of force is also unimportant with respect to the functionality of the invention. Alternatively or additionally to a compressive force, for example, a tensile force can also be exerted on the intermediate element, depending on the structure of the guiding device. The term "pressing force" must thus also be understood as a pulling force, which enables a relative positioning of the intermediate element inside the guide rail.

It can further be advantageous for the intermediate element in a guiding device according to the invention to press against an area of the guide rail that opposes at least one of the stops for the decorative elements. In particular when using a guiding device according to the invention for manufacturing decorative parts for the interior of motor vehicles, an intermediate element that is relatively small in terms of its width is usually to be joined with decorative elements that are relatively large, also in terms of their width. In this advantageous embodiment, the stops of the decorative elements are here opposed to the stop, as it were. As a consequence, the alignment of the stops defines the relative position of the intermediate element to the decorative elements on the finished decorative part. It can here be advantageous for the area of the guide rail against which the compensation device presses the intermediate element to be reversibly adjustable in its relative position with respect to the first and second stop. For example, a variation by means of sliding mechanisms or securable elongated hole systems is conceivable. With the assistance of such devices, a guiding device according to the invention makes it possible to use a plurality of different intermediate elements in a single guiding device. The desired connection tolerance can also be adjusted in this way. Both intermediate elements that are essentially joined flush with the two decorative elements and protruding intermediate elements can be fabricated on the one side.

It can also be advantageous to have guide rails with inner contours adjusted to the outer contour of the intermediate element in such a way that the compensation device yield a line contact between the intermediate element and guide rail. Such line contacts serve to relatively position the intermediate element without impairing its movement during the joining process, in particular without causing the intermediate element to become jammed in the guide rail.

It may also be advantageous in a guiding device according to the invention to press at least the portion of the intermediate element that lies on the visible face after the two decorative elements have been joined by means of the intermediate element against a region of the guiding location. The visible face here relates to the finished installation, for example in the interior of a motor vehicle. This makes it possible to generate a defined position of the portions of the intermediate element lying on the visible face, for example the braid or welt, relative to the decorative elements. This visible face is usually the side relevant to the user of a guiding device according to the invention, which is why such an embodiment focuses particular attention on this side.

It may further be advantageous if the compensation device is able to offset tolerances, in particular length tolerances, for the intermediate element measuring up to 4 mm. Length tolerances here relate in particular to the dimension of the intermediate element essentially perpendicular to the joint, in particular the assembly seam. Even slight compensations are conceivable given lower manufacturing tolerances for the intermediate element. Let it be emphasized in particular that the compensation device only compensates for existing dimensional deviations. Intermediate elements or areas of an intermediate element lying within the required joining tolerances need also not be compensated.

It may further be advantageous for the guide rail of a guiding device according to the invention to envelop and contact the intermediate element on three sides, and for the compensation device to be provided on the fourth side. The guide rail forms a quasi-geometric image of the profile of the intermediate element, and guides the intermediate element in the guiding device in a contacting manner. The intermediate element is prevented from becoming jammed in the guiding device in this way, since the compensation device provides enough play on the fourth side to prevent the intermediate element from getting jammed against the compensation device. On the one hand, care must here be taken to ensure that the force with which the compensation device presses against the intermediate element is high enough to arrive at a sufficiently reliable definition for the relative position of the intermediate element. On the other hand, it must be ensured that the intermediate element is prevented from becoming jammed in the guide rail by the force of the compensation device.

Since the guide rail is a three-dimensional part, let it still be noted that the four sides must be understood as lying in one plane. Three sides are here defined by the contacting environment of the intermediate element, and the fourth side by the compensation device. The two directions of the guide rail aligned perpendicular to these four sides are open, so as to empty into the inlet opening on one side, and into the outlet opening on the other side. Along a line perpendicular to the plane formed by the four sides, the direction of movement of the intermediate element runs within the guide rail. In other words, the four sides simultaneously define the profile sides of the guide rail.

It may be advantageous in guiding device according to the invention for the latter to be designed to be able to process an intermediate element in the form of a braid or welt or piping, which lies on the visible face of the decorative part after the decorative elements have been joined by means of the intermediate element. Compensating for manufacturing tolerances is very important especially when using braids or welts or piping, since the fabrication of these intermediate elements is subject to large tolerances owing to the material thicknesses, in particular in the case of leather or material variants. However, precisely such elements are also especially vulnerable in terms of their ability to withstand friction and the wear that accompanies it. Therefore, a guiding device according to the invention is especially advantageous when using braids or welts or piping as the intermediate elements.

For example, the compensation device in guiding device according to the invention can exhibit a spring element. Such a spring element can here be designed as a flat spring, or as a spiral spring, or as a combination of various spring elements, for example. In particular a flat spring makes it possible to effect compensation over a longer region along the guide rail, i.e., exert a force on the intermediate element. However, another element can be added to the spring element, for example a damping element, e.g., so as to balance out an oscillation given highly variable manufacturing tolerances within an intermediate element. For example, such a damping element can be used to prevent compensation overshoot, and hence a deterioration in tolerance compensation.

It may be further advantageous in a guiding device according to the invention for the distance between the outlet opening of the guide rail for the intermediate element and a joint to lie within a range of one to ten times the material thickness of one of the decorative elements with a guiding device placed in the joining device. For example, if the material thickness of one of the decorative elements measures 0.5 mm, the distance between the outlet opening of the guide rail and the joint ranges between 0.5 and 5 mm. However, this distance is preferably reduced to a minimum. In ideal embodiments, this distance measures nearly 0 mm. This distance is relevant in particular because, once it leaves the guide rail, the intermediate element can once again vary its position relative to the decorative elements without any guidance. The longer this distance, i.e., the longer the intermediate element moves without guidance, the greater the deviations in the relative position of the intermediate element from the guide rail definition that can again arise. Another advantage to a lower distance has to do with the simplified and also improved ability to manufacture connections in radial form. For example, a guiding device according to the invention can be used to also fabricate a curved seam, so that the advantages according to the invention can be imparted to decorative parts with complex geometries. In several embodiments, it may even be possible for the guide rail to at least partially protrude over the joint in a joining device, thereby causing the guided region to overlap the already joined region. Such an embodiment is adjusted to the conveying device under the junction, in particular with respect to a joint established with seams in the case of sewing machines.

In order to make it even less likely that the compensation device will get jammed in the guide rail, it may be advantageous in a guiding device according to the invention for the surface of the compensation device to exhibit a coefficient of sliding friction that measures less than 0.7 with the surface of the intermediate element, at least in the region in which it comes into contact with the intermediate element. It basically makes sense to reduce the coefficient of sliding friction to a minimum, since in addition to preventing a jam from occurring, it also avoids having to exert an unnecessary level of force to guide the intermediate element in the guide rail. One way to reduce the coefficient of sliding friction is by treating the surface of the compensation device. However, a coating is also possible, for example one comprised of friction-minimizing substances, such as Teflon.

The present invention further relates to a method for joining at least two decorative elements by means of an intermediate element, which exhibits the following steps:

- Placing a first decorative element against a first stop of a guiding device,
- Placing a second decorative element against a second stop of the guiding device,
- Introducing the intermediate element into a guide rail of the guiding device with compensation device to offset dimensional tolerances of the intermediate element,
- Simultaneously and continually moving the two decorative elements and intermediate element in the same direction,
- Joining the two decorative elements by means of the intermediate element in the direction of movement of the decorative element and intermediate element.

As described at length above with respect to the guiding device according to the invention, one advantage in a method according to the invention is that such a method reduces potential manufacturing tolerances for the intermediate element regardless of its size, thereby visually and haptically improving the resultant decorative part as a product.

It may be advantageous in a method according to the invention to use a guiding device according to the invention of the kind described above.

The present invention also relates to a decorative part that was fabricated with the method according to the invention.

The present invention further relates to a joining device, which exhibits at least one guiding device according to the invention. For example, such a joining device can be designed as a sewing machine for purposes of joining in the form of seams.

BRIEF DESCRIPTION OF THE DRAWINGS

The present invention will be explained in greater detail based on the figures in the drawing. In the description to the drawing figures, the terms "right", "left", "top", "bottom" relate to the figures in an alignment with normally legible reference numbers. Shown on.

DETAILED DESCRIPTION OF THE ILLUSTRATED EMBODIMENT(S)

Figure 1:
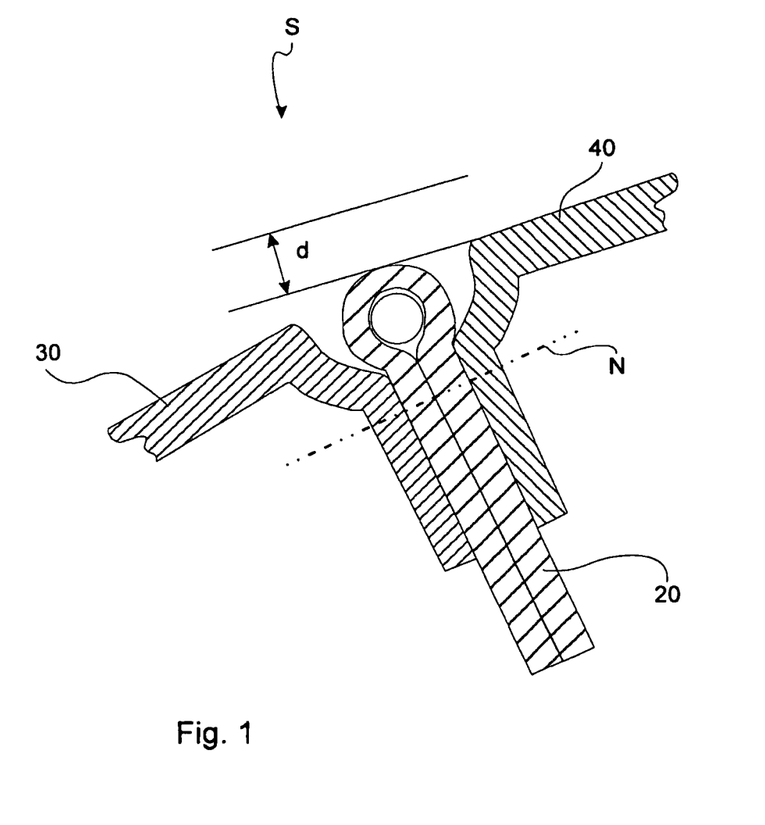
FIG. 1 is a cross section through an embodiment of a decorative part manufactured according to the invention with a welt.

FIG. 1 presents a cross section of a decorative part, which consists of a first decorative element 30 and a second decorative element 40 put together by means of an intermediate element or intermediate piece 20. In particular, it is provided that the decorative blanks be joined together, in particular sewn together. A lug seam or decorative element, e.g., decorative element 30, is here joined or sewn together with a lug seam or decorative element, e.g., decorative element 40. The respective lug seam is a region of the respective decorative blank that runs along a respective edge section of a decorative blank.

The intermediate element 20 is here designed as a welt. The joint N runs in an area that is not visible, and faces away from the visible face S. The two decorative elements 30 and 40 form a depression that curves away from the visible face S, and comes to accommodate the welt of the intermediate element 20. It is of vital importance to the user of a motor vehicle incorporating such a decorative part how far the welt protrudes over the surface of the visible face of the decorative elements 30 and 40. This excess length is marked with the letter d on FIG. 1, and defined as the joining tolerance on the visible face in relation to the two decorative elements 30 and 40 and the intermediate element 20. The larger the joining tolerance d is, the more the intermediate element 20, in particular the welt of the intermediate element 20, can project over the surface of the decorative part on the visible face during fabrication of the decorative part. This protrusion creates the impression of lower quality from a visual and haptic standpoint on the one hand, and produces an elevated wear owing to the increased friction on the welt of the intermediate element 20 on the other. Therefore, the joining tolerance d must be reduced to a minimum.

Figure 2:
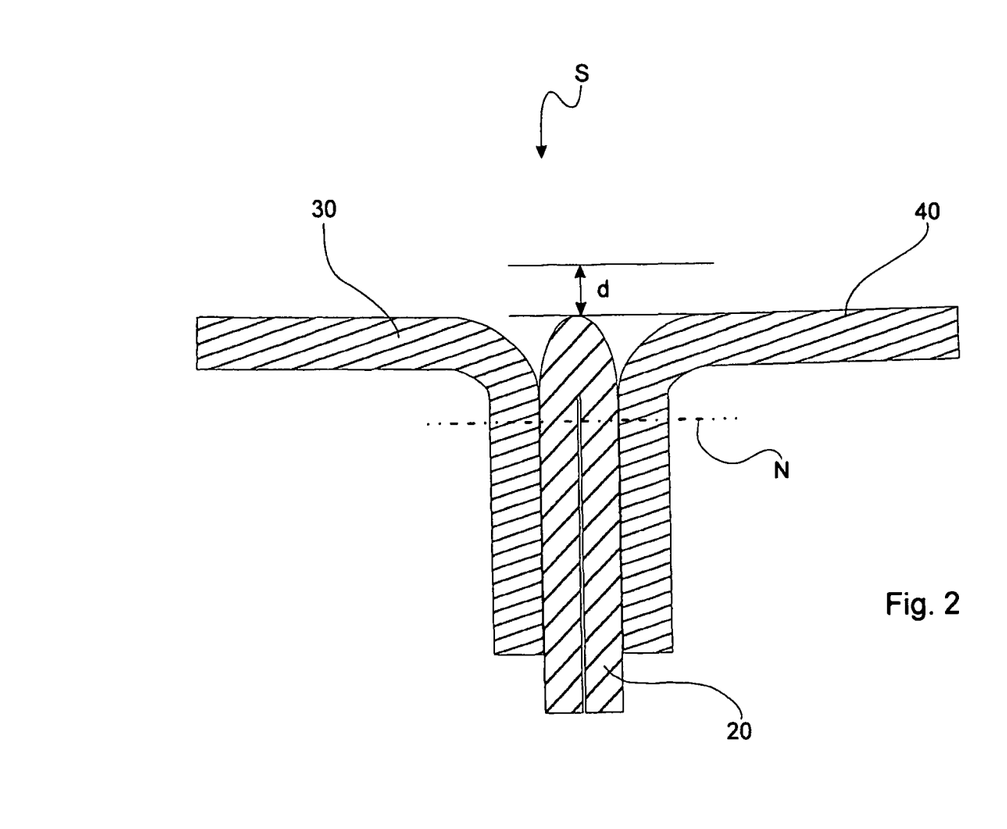
FIG. 2 is a cross section through a decorative part similar to FIG. 1 with a braid.

FIG. 2 shows an embodiment similar to FIG. 1, but an intermediate element 20 was here used with a braid. In this case, the depression formed by the two decorative elements 30 and 40 is curved in the opposite direction by comparison to FIG. 1. A joining tolerance d is once again defined here, which determines how far the braid of the intermediate element 20 projects over the decorative elements 30 and 40. As a consequence, a minimal projection by the braid of the intermediate element is desirable here as well. A joint N is here also provided on the side lying opposite the visible face S of the decorative part.

Figure 3:
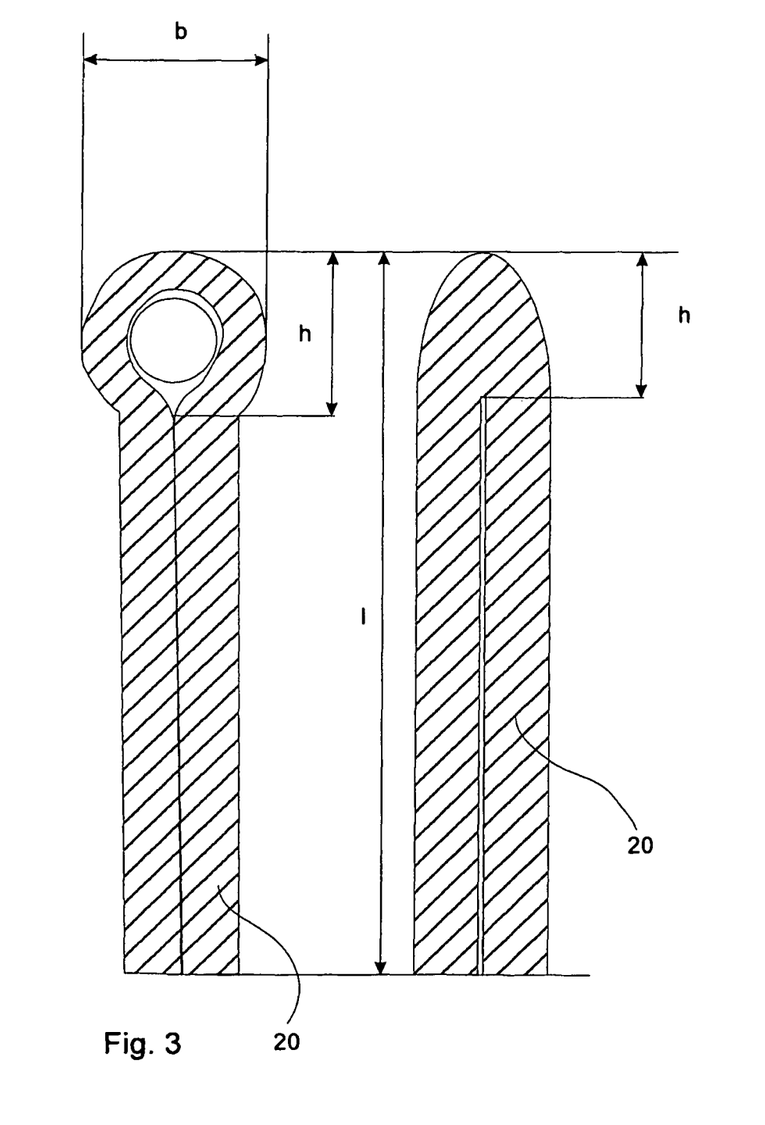
FIG. 3 is a cross section of two intermediate elements with a welt and a braid.

FIG. 3 shows the two intermediate elements 20 on the two FIGS. 1 and 2 separately one next to the other, meaning without decorative elements 30 and 40, specifically once with braids and once with welts.

The left of the two intermediate elements 20 on FIG. 3 exhibits a welt with a core in the form of steel cable. The geometric dimensions of the intermediate element 20 exhibit a length l, as well as a width and height in relation to the welt. The width and height, and in particular the length, of the intermediate element 20 are here subject to manufacturing tolerances, for example which stem from the different material thicknesses or adhesive bonding tolerances when folding the intermediate element 20.

In the intermediate element 20 with a braid depicted on the right hand side, the height of the braid itself and the length of the intermediate element 20 are subject to manufacturing tolerances as well. In particular with respect to the length l, which can measure approx. 12 mm when used for interior decorative parts, for example, manufacturing tolerances of up to ±1 mm must be accepted. In other words, this means that the length l fluctuates between 11 mm and 13 mm. When these intermediate elements 20 are used between two decorative elements 30 and 40 for joining purposes, it can happen that either the braid or welt will lie in a depression or project out of the latter by up to 2 mm, depending on the alignment of the intermediate elements 20 on the surface of the decorative elements 30 or 40. However, a distinctly lower tolerance is normally required in terms of braid or welt protrusion for the reasons already cited. In particular, d 0.8 mm must be observed for the joining tolerance, i.e., ±0.4 mm. In order to achieve this, it is necessary that these manufacturing tolerances be compensated while joining the two decorative elements 30 and 40 via the intermediate element 20.

Figure 4:
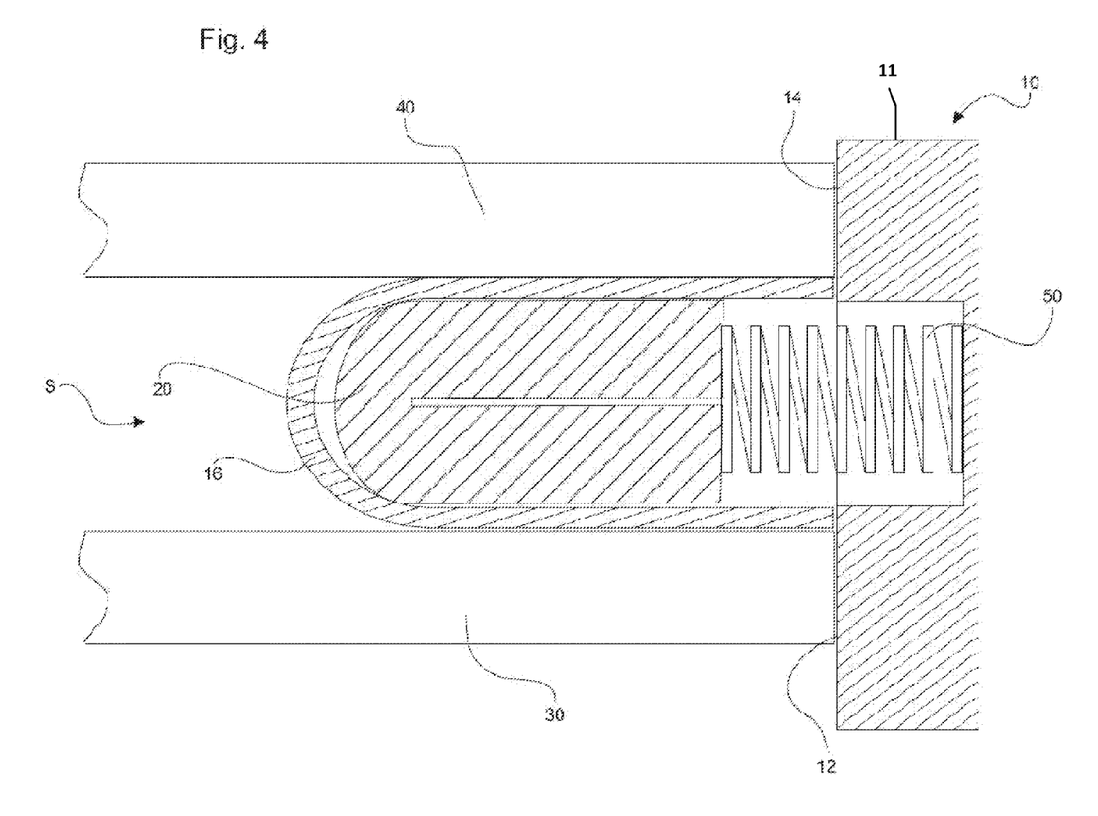
FIG. 4 is a cross section of a guiding device according to the invention in an embodiment with inlaid decorative elements and inlaid intermediate element.

This compensation is enabled by a guiding device 10 according to the invention, an embodiment of which is shown on FIG. 4. The guiding device 10 on FIG. 4 exhibits a guide block 11 that includes two stops 12 and 14, which are here configured as a joint stop. The fitting edges of the decorative elements 30 and 40, for example of a lower and upper leather layer, abut against these stops 12 and 14. The two decorative elements 30 and 40 can be moved along the stops 12 and 14, wherein the direction of movement runs essentially perpendicular to the drawing plane on FIG. 4. A guide rail 16 is situated between the two decorative elements 30 and 40. This guide rail 16 is designed as a hollow profile, and already incorporates an inlaid intermediate element 20. Compensation device 50 presses the intermediate element 20 against the left end of the guide rail 16. A gap here remains in the area of the tip between the guide rail 16 and intermediate element 20, and the force exerted by the compensation device 50 pushes the intermediate element 20 exclusively against two lines, or linear, narrow regions on the upper side and lower side of the tip of the profile of the guide rail 16. In this way, the intermediate element 20 is prevented from jamming.

The compensation device 50 is here configured as a spiral spring. The right side of the spiral spring is fixed in a depression in the shared stop of the guiding device 10. The left side comes into contact with the intermediate element 20, and is provided with a guide plate, not depicted in this drawing, which in terms of its surface quality is optimized to reduce sliding friction between the guide plate and intermediate element 20. The intermediate element 20 can also move along a line of movement, which runs essentially perpendicular to the drawing plane of FIG. 4. The tip of the guide rail 16 is present in the form of a stop situated opposite the two stops 12 and 14 of the two decorative elements 30 and 40.

Figure 5:
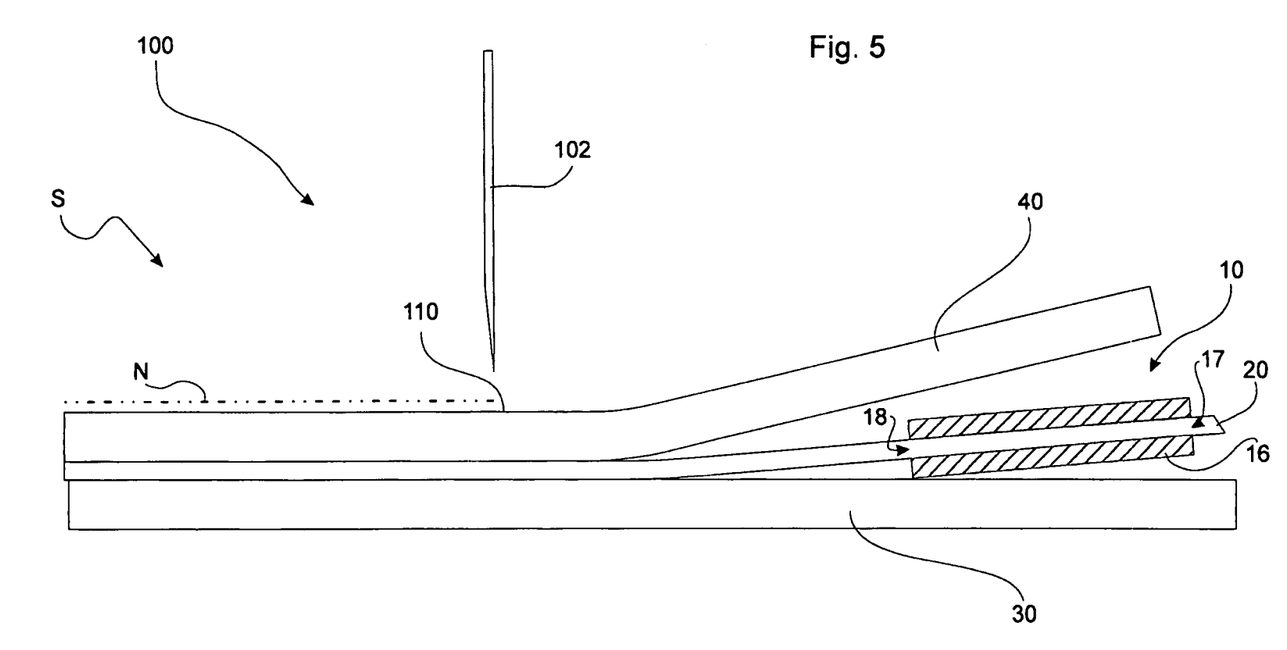
FIG. 5 is a side view of a guiding device according to the invention in a joining device according to an embodiment.

FIG. 5 presents an embodiment of a joining device 100 according to the invention.

The joining device 100 exhibits a joining means 102, here taking the form of a needle. The needle can puncture through the decorative elements 30 and 40, as well as through the intermediate element 20, and generates a seam N. The seam runs along the direction of movement of the decorative elements 30 and 40 and the intermediate element 20, to the left on FIG. 5. The seam begins at the joint 110 at which the joining means 102, i.e., the needle, punctures through the two decorative elements 30 and 40 and the intermediate element 20.

Visible on the right side of FIG. 5 is a guiding device 10 according to the invention.

The guiding device 10 is here shown in cross section, and has a design similar to that depicted on FIG. 4. The guiding device 10 has a guide rail 16 with an inlet opening 17 for the intermediate element 20, and an outlet opening 18 for the intermediate element 20. FIG. 5 shows a snapshot during the production process. The two decorative elements 30 and 40 as well as the intermediate element 20 here run toward each other, guided by the guiding device 10, in particular guided by the guide rail 16 with respect to the intermediate element 20. The production process for the decorative part takes place from right to left on FIG. 5. After the three elements, i.e., the intermediate element 20 and decorative elements 30 and 40, have been guided toward each other, and above all positioned relative to each other by the two stops 12 and 14 as well as the guide rail, the joint can be established.

Figure 6:
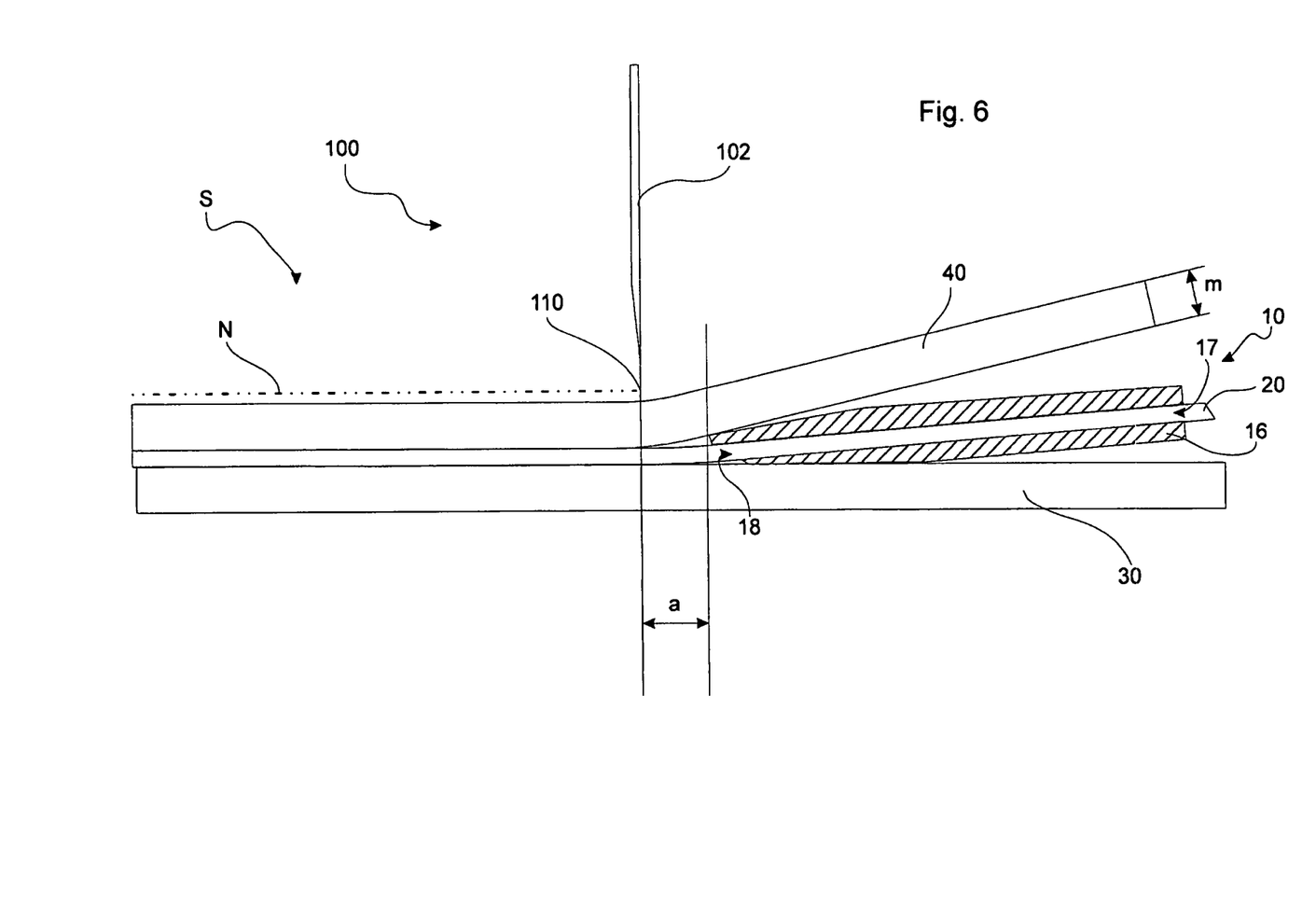
FIG. 6 is another embodiment alternative to the embodiment according to FIG. 5.

FIG. 6 depicts another embodiment of the present invention similar to the embodiment on FIG. 5. A joining device 100 is provided with a joining means 102 in the form of a needle here as well. However, the start of the seam N at the joint 110 is here clearly provided in closer proximity to the outlet opening 18 of the guide rail 16. The distance a between the outlet opening 18 and joint 110 is minimized. In this case, the distance a is identical to the material thickness m of the second decorative element 40. In order to achieve this, the guiding device 10 is moved distinctly close to the joint 110 on the one hand. Beyond that, the guide rail 16 is designed in such a way that it can be moved closer to the joint 110 due to wedge-like regions in the progression of the guide rail 16. In this way, the distance a left unguided by the intermediate element 20 is minimized, making the relative positioning of the intermediate element at the joint even more precise.

Figure 7:
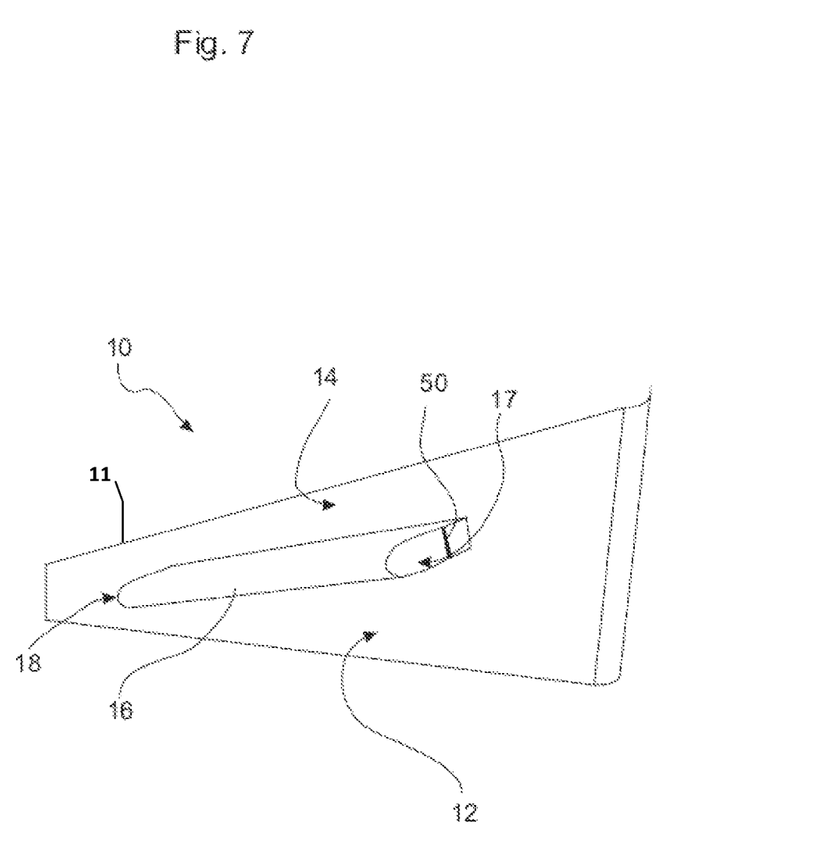
FIG. 7 is an isometric view of another embodiment of the guiding device according to the invention.

For purposes of further illustration, FIG. 7 presents an isometric view of an embodiment of a guiding device 10. The advantages to the guiding device 10 are here revealed. A single, for example one-piece, essentially triangular guiding device 10 incorporates a guide block 11 that includes both the two stops 12 and 14 for the decorative elements 30 and 40, as well as a guide rail 16 for the intermediate element 20. The guide rail 16 exhibits an inlet opening 17 and an outlet opening 18, through which the intermediate element 20 can be moved through the guide rail 16. Provided within the guide rail 16 is compensation device 50, which resembles the embodiment on FIG. 4, and can press the intermediate element 20 against the guide rail 16 in an opposite direction to the two stops 12 and 14.

The invention claimed is:

1. A guiding device for introducing an intermediate element between at least two decorative elements to be joined, the guiding device comprising:
   a first stop for a first decorative element;
   a second stop for a second decorative element;
   a guide rail comprising an inlet opening and an outlet opening for the intermediate element and an inner surface that corresponds at least partially to an outer contour of the intermediate element; and
   a compensation device for offsetting dimensional tolerances of the intermediate element, wherein the compensation device biases the intermediate element in a direction away from the first and second stops such that the intermediate element is pressed against the inner surface of the guide rail, thereby defining the position of the intermediate element relative to the first and second stops.

2. The guiding device according to claim 1, characterized in that the compensation device presses the intermediate element against a region of the guide rail that is opposite at least one of the first and second stops.

3. The guiding device according to claim 1, characterized in that at least a portion of the intermediate element that lies on a visible face of a decorative part after the first and second decorative elements have been joined by means of the intermediate element is pressed against the inner surface of the guide rail.

4. The guiding device according to claim 1, characterized in that the compensation device is able to offset length tolerances of the intermediate element measuring up to 4 mm.

5. The guiding device according to claim 1, characterized in that the guide rail envelops and contacts the intermediate element on three sides, and the compensation device is provided on a fourth side.

6. The guiding device according to claim 1, characterized in that the intermediate element comprises a braid or welt or piping, and the intermediate element lies on a visible face of a decorative part after the first and second decorative elements have been joined by means of the intermediate element.

7. The guiding device according to claim 1, characterized in that the compensation device comprises a spring element.

8. The guiding device according to claim 1, characterized in that the distance between the outlet opening of the guide rail for the intermediate element and a joint lies within a range of one to ten times the material thickness of one of the decorative elements with the guiding device placed in a joining device.

9. The guiding device according to claim 1, characterized in that the compensation device has a surface that presses the intermediate element against the inner surface of the guide rail, and a coefficient of sliding friction measured between the intermediate element and the surface of the compensation device is less than 0.70.

10. A method for joining at least two decorative elements by means of an intermediate element, comprising the following steps:
    placing a first decorative element against a first stop of a guiding device;
    placing a second decorative element against a second stop of the guiding device;
    introducing the intermediate element into a guide rail of the guiding device with a compensation device that biases the intermediate element in a direction away from the first and second stops to offset dimensional tolerances of the intermediate element;
    simultaneously moving the first and second decorative elements and the intermediate element in the same direction; and
    joining the first and second decorative elements by means of the intermediate element.

11. The method according to claim 10, characterized in that the guide rail comprises an inlet opening and an outlet opening for the intermediate element and an inner surface that corresponds at least partially to an outer contour of the intermediate element.

12. A decorative part fabricated using the method of claim 10.

13. A joining device comprising at least one guiding device with the features in claim 1 and adapted to join the guided decorative elements.

14. A guiding device, comprising:
    a guide block having stop surfaces for guiding decorative elements to be joined with an intermediate element;
    a guide rail extending from the stop surfaces of the guide block and providing an inner space between the guide rail and the guide block for guiding the intermediate element between the decorative elements, wherein the guide rail and inner space extend along a guidance direction so that the stop surfaces of the guide block extend laterally from the guide rail,
    wherein the guide rail comprises an inlet opening and an outlet opening lying at opposite ends of the guide rail with respect to the guidance direction, so that the intermediate element can be passed through the inner space of the guide rail and be joined with the decorative elements by sewing beyond the outlet opening of the guide rail when the decorative elements are moved along the laterally extending stop surfaces in the guidance direction together with the intermediate element; and
    a compensation device disposed in the inner space of the guide rail and at the guide block, the compensation device being configured to bias the intermediate element away from the guide block while the intermediate element passes through the inner space.

15. The guiding device according to claim 1, wherein the compensation device presses the intermediate element against a region of the guide rail that faces the guide block.

16. The guiding device according to claim 1, wherein the compensation device is configured to offset a tolerance of a length of the intermediate element of up to 4 mm.

17. The guiding device according to claim 1, wherein the guide rail envelops and contacts the intermediate element on three sides, and the compensation device is provided on a fourth side.

18. The guiding device according to claim 1, wherein the compensation device comprises a spring.

19. The guiding device according to claim 1, wherein the distance between the outlet opening of the guide rail for the intermediate element and a joint lies within a range of one to ten times the material thickness of one of the decorative elements with the guiding device placed in a joining device.

20. The guiding device according to claim 1, wherein the compensation device exhibits a coefficient of sliding friction of less than 0.70 with the intermediate element.

* * * * *